United States Patent [19]

Potier et al.

[11] Patent Number: 5,062,478
[45] Date of Patent: Nov. 5, 1991

[54] SNAP-FASTENING ASSEMBLY DEVICE FOR MOTOR VEHICLE HEAT EXCHANGERS

[75] Inventors: Michel Potier, Rambouillet; Gilles Briet, Gueugnon, both of France

[73] Assignees: Hutchinson, S.A., Paris; Valeo Thermique Moteur, S.A., Le Mesnil-Saint-Denis, both of France

[21] Appl. No.: 516,331

[22] Filed: Apr. 30, 1990

[30] Foreign Application Priority Data

May 5, 1989 [FR] France ................ 89 05976

[51] Int. Cl.$^5$ .............. F28F 9/00; F16L 37/133
[52] U.S. Cl. .................... 165/178; 285/307; 285/319; 285/921
[58] Field of Search ............ 165/176, 178, 76; 285/137.1, 921, 307, 319

[56] References Cited

U.S. PATENT DOCUMENTS

| | | |
|---|---|---|
| 2,885,754 | 5/1959 | Munse . |
| 4,697,832 | 10/1987 | Dickirson ............... 285/319 |
| 4,773,474 | 9/1988 | Stay . |
| 4,887,665 | 12/1989 | Briet .................. 165/176 |
| 4,966,398 | 10/1990 | Peterson ............... 285/319 |

*Primary Examiner*—Albert W. Davis, Jr.
*Attorney, Agent, or Firm*—Bell, Seltzer, Park & Gibson

[57] ABSTRACT

An assembly device for a heat exchanger and tubular connector assembly, in which the tubular connector opens out into an opening in a tank of the heat exchanger and is fixed firstly to a flexible hose by a permanent connection and secondly to the tank via an easily disassembled resilient connection, with sealing between the tubular connector and the tank being provided by an elastomer ring which is radially compressed therebetween. The tubular connector and the tank are in alignment along an assembly axis and they constitute two parts to be assembled by snap fastening at least one axially-directed tab carried on one of the two parts. The tab is radially resilient and is provided with a snap-fastening catch which engages axial abutment means carried by the other one of the two parts. The tab has an expansion spring configuration whose resilient reaction acts radially in the direction tending to maintain the tab pressed against the abutment means when the said two parts are in the assembled position. The spring-forming tab is in the form of a leaf spring comprising at least a first branch and a second branch substantially parallel to each other and to the assembly axis, with the first branch projecting from one of the two parts in the assembly direction while the second branch projects from the axially inner end of the first branch in the opposite direction to the assembly direction, such that the spring-forming tab is generally U-shaped, with the catch projecting radially outwards from the second branch of the tab.

5 Claims, 1 Drawing Sheet

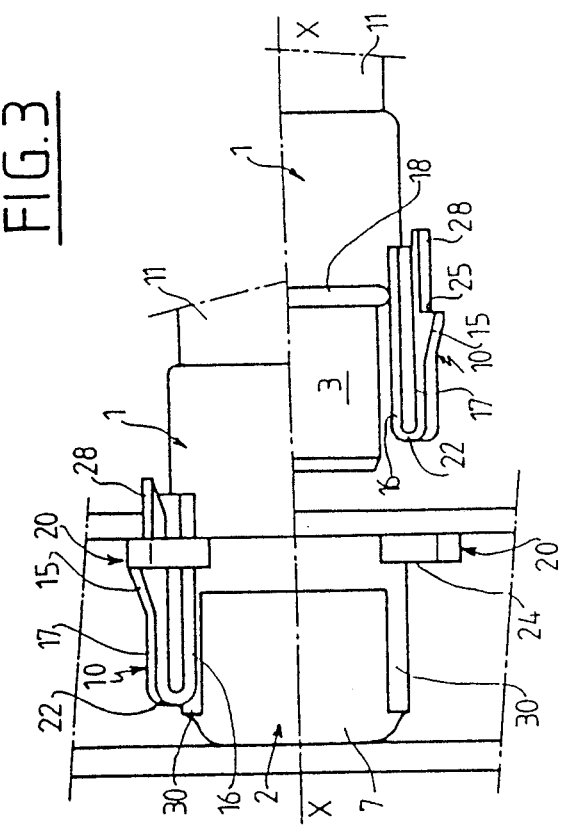
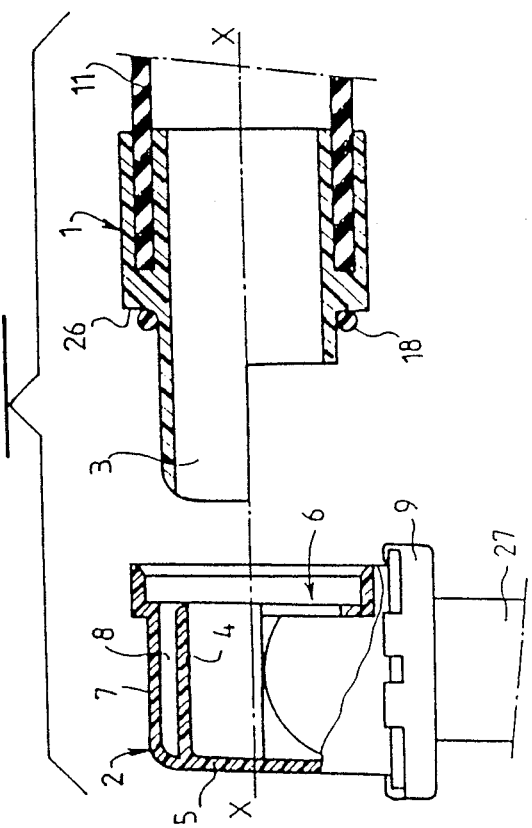
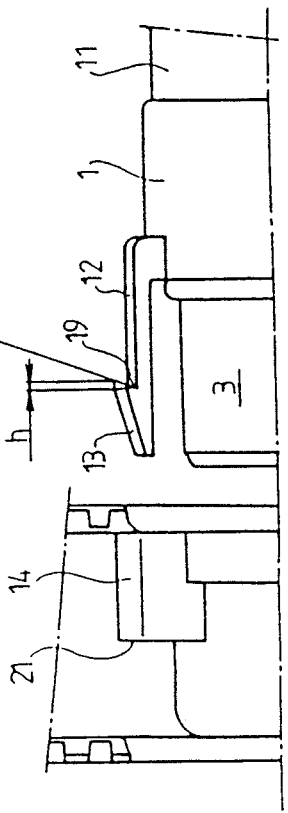
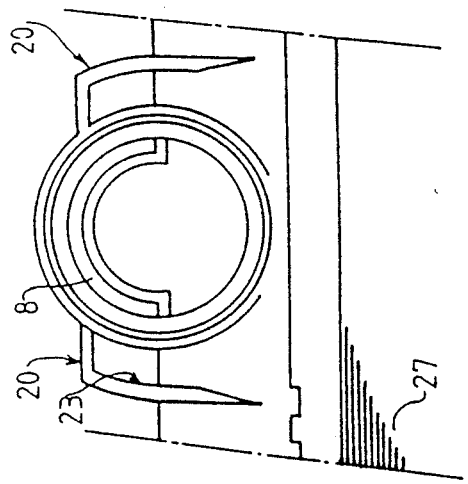

SNAP-FASTENING ASSEMBLY DEVICE FOR MOTOR VEHICLE HEAT EXCHANGERS

The present invention relates to a snap-fastening rapid action assembly device for motor vehicle heat exchangers.

BACKGROUND OF THE INVENTION

U.S. Pat. No. 4,887,665 describes an assembly device for a heat exchanger and tubular connector assembly in which the tubular connector opens out into the tank of the heat exchanger (e.g. radiator) and is fixed to the tank by an easily disconnected resilient connection. In this case, the tank and the tubular connector are held assembled together by means of at least one axially directed tab carried by the tubular connector, which tab is resiliently displaceable in a radial direction and is provided with a snap-fastening catch at its axially inner end. The snap-fastening catch comes axially into abutment against the axially outer end of a tubular guide lug carried by the tank and in which the tab is engaged, the catch having the shape of a fish hook in order to prevent the parts coming apart under the effect of the jolts in pressure inherent to the operation of a cooling circuit.

However, this design requires relatively large axial clearance in order to enable the catch to snap-fasten on the axially outer end of the tubular guide and abutment lug.

The object of the present invention is to avoid this drawback, i.e. to reduce the axial clearance required for assembly purposes to a minimum, while avoiding any danger of the catch releasing and facilitating disassembly.

SUMMARY OF THE INVENTION

The present invention provides an assembly device for a heat exchanger and tubular connector assembly, in which the tubular connector opens out into an opening in a tank of the heat exchanger and is fixed firstly to a flexible hose by a permanent connection and secondly to the tank via an easily disassembled resilient connection, with sealing between the tubular connector and the tank being provided by an elastomer ring which is radially compressed therebeteween, the tubular connector and the tank being in alignment along an assembly axis and constituting two parts to be assembled by snap fastening at least one axially-directed tab carried on one of the two parts, said tab being radially resilient and being provided with a snap-fastening catch, said catch engaging axial abutment means carried by the other one of the two parts, said tab having an expansion spring configuration whose resilient reaction acts radially in the direction tending to maintain the tab pressed against the abutment means when the said two parts are in the assembled position, wherein the said spring-forming tab is in the form of a leaf spring comprising at least a first branch and a second branch substantially parallel to each other and to the assembly axis, with the first branch projecting from one of the two parts in the assembly direction while the second branch projects from the axially inner end of the first branch in the opposite direction to the assembly direction, such that the spring-forming tab is generally U-shaped, with the catch projecting radially outwards from the second branch of the tab.

Preferably, the axial abutment means is made in the form of a tubular lug in which the spring-forming tab engages with the snap-fastening catch coming into abutment against an axially outer end thereof.

Preferred embodiments of the invention include other features as specified in the following description.

BRIEF DESCRIPTION OF THE DRAWINGS

The invention is described by way of example in the following description made with reference to the accompanying drawing, in which:

FIG. 1 is a lateral elevation view partially in axial section through a heat exchanger and an associated tubular connector when disassembled;

FIG. 2 is a plan view relating to the prior art;

FIG. 3 is a plan view in which the bottom half-view corresponds to FIG. 1, i.e. the tank and the tubular connector are shown disassembled, while the top half-view corresponds to the same two parts when assembled together; and FIG. 4 is an end view of the heat exchanger of its own.

DETAILED DESCRIPTION

The assembly device shown in FIG. 1 is of the same type as described in above-mentioned U.S. Pat. No. 4,881,665. This figure clearly shows a tubular connector 1 suitable for engaging in a tank 2 of a heat exchanger 27, in particular for a motor vehicle radiator. The connector 1 and the tank 2 are both made of plastic material.

The presence of a guide finger or fingernail 3 projecting from the connector 1 and also of a guide partition 4 projecting from the wall 5 of the tank 2 can be observed, said wall 5 being the wall opposite to the opening 6 provided in the tank.

Sealing between the connector and the tank is obtained by means of an elastomer ring 18 disposed on the guide and assembly finger 3 and bearing against an inwardly directed shoulder 26 on the connector.

The partition 4 and the wall (or arch) 77 extending substantially parallel thereto define a housing 8 for receiving the guide finger 3 (see also FIG. 3). The guide finger 3 is intended to be inserted almost completely into the above-mentioned housing 8. As already mentioned in U.S. Pat. No. 4,881,665, it is easy to see that penetration of the finger 3 into its housing inside the tank 2 makes it possible to omit the connection tube which, in prior solutions, projects from the tank for assembly with the tubular connector, with the absence of such a projecting tube making it easier to crimp the perforated tube plate 9 to the tank 2.

FIG. 1 shows a preferred configuration for the guide finger 3 and the corresponding guide partition 4 which are both defined by half-circumstances, even though, in general, any circumferential arc configuration would be possible providing a passage is left to pass a sufficient flow of cooling in one direction or the other between the tank and a flexible hose 11. The hose 11 forms a portion of the cooling circuit and is fitted with the above-mentioned tubular connector 1 at its end for gaining access to the tank.

The half-view shown in FIG. 2 shows the solution adopted in the prior art as represented by above-mentioned U.S. Pat. No. 4,887,665 for holding together the tubular connector 1 and the tank 2 when assembled against the effect of pressure jolts that are inherent to the operation of a cooling circuit, thereby avoiding any danger of them coming apart. This solution is constituted by at least one axially-directed tab such as the tab shown by reference 12 carried by the tubular connector 1. The tab is radially resilient and is provided with a catch 13 for snap-fastening with an axial abutment 14 constituted by a tubular lug 21 carried by the tank 2 (cf. also FIG. 4).

In the half-view of FIG. 2, it is also easy to observe that the latching face 19 of the catch 13 is disposed at an angle relative to the direction in which the tab 12 extends, said face being inclined at an angle α in the direction opposite to the assembly direction, i.e. at an acute angle relative to the tab 12, with h representing the offset of the radially outer end of the face 19 relative to the vertical position, i.e. to the disposition which the face would have if it extended perpendicularly to the tab 12. As already mentioned when describing the prior art, although the use of a fish hook-shaped catch 13 is highly effective for preventing the connector 1 coming apart from the tank 2, this solution nevertheless suffers from the drawback of the considerable axial clearance, greater than h, which is required with this type of design to enable the catch 13 to snap/fasten onto the axially outer end 21 of the tubular lug 14.

The bottom half-view of FIG. 3 shows the solution proposed in the context of the present invention for avoiding the drawback constituted by the considerable axial clearance provided in the above-mentioned assembly.

To this end, a tab 10 is made having an expansion spring configuration, whose resilient reaction acts radially outwards, i.e. in the direction appropriate for holding the tab 10 pressed against the abutment means 20 carried by the tank when the tank and the connector 1 are in the assembled position.

The spring forming tab 10 is preferably in the form of a leaf spring comprising a first branch 16 and a second branch 17 which are substantially parallel to each other and to the assembly axis x—x. More precisely, the first branch 16 projects from the tubular connector 1 in the assembly direction, while the second branch 17 projects from the axially inner end 22 of the first branch 16 in a direction opposite to the assembly direction. In this manner, the tab 10 forms a spring having an overall U-shape. The catch 15 is carried by the free branch 17 from which it projects radially outwards.

It is thus easy to understand that under the effect of pressure jolts, inherent to the operation of a cooling circuit, the free branch 17 of the spring 10 tends to be pressed against the inside wall 23 of the tubular lug 20 constituting the axial abutment for the catch 15, which catch therefore remains firmly snap-fastened against the axially outer end 24 of the above-mentioned guide and abutment lug 20. Under these conditions, it is therefore clear that the catch 15 does not need to have a fish-hook shape, in other words the latching face 25 of the catch 15 may be disposed substantially perpendicularly relative to the free arm 17 carrying it, thereby reducing to a minimum the axial clearance required for assembling the connector 1 to the tank 2.

Axial traction force exerted under the effect of pressure jolts on the connector 1 when assembled gives rise to a reaction in each of the guide and abutment lugs 20 which reactions present a couple acting, relative to the end 22 common to the pairs of branches 16 and 17 of the tabs 10 in such a direction as to cause the branch 17 to pivot outwards about the end 22, i.e. to cause the branches 16 and 17 to move apart from one another in pairs, thus ensuring that each of the tabs 10 remains firmly engaged against the corresponding abutment 20.

It is easy to understand that the solution of the present invention also facilitates disassembly of the connector 1 from the tank 2 because the spring-forming tabs 10 are accessible from the connection instead of from over the tank of the heat exchanger 17. To this end, it may be observed (see in particular the top half-view of FIG. 3) that the axially outer portion 28 of the free branch 17 of the tab 10 constitutes an actuator lever for actuating the tab to enable immediate disassembly.

In order to improve engagement of the tab 10, i.e. of the free branch 17, against the inside wall 23 of the tubular lug 20, the tank 2 includes an axial rib 30 against which the branch 16 bears when in the assembled position, said rib projecting from the outer wall of the arch 7 of the tank (the rib 30 is visible in FIG. 3 only). In addition, the latching face 25 of the catch may advantageously be inclined at an angle which is slightly obtuse relative to the branch 17 carrying the catch, thereby further reducing the need for axial clearance while improving the engagement of the branch 17 against the abutment 20.

As can be seen from the above, the invention is not limited in any way to the embodiments, the implementation and the application described above in detail: on the contrary it extends to any variant that may occur to the person skilled in the art without going beyond the scope of the present invention. In particular, the disposition of the tabs 10 and of the abutments 20 may be interchanged, i.e. the tabs 10 may be carried by the tank 2 while the abutments 20 are provided on the tubular connector 1, without thereby changing the results.

Further, it is clear that the spring-forming tabs 10 may be integrally formed with the connector (or the tank) or else they may be constituted by metal tabs which are applied thereto or overmolded therewith as taught in above-mentioned French patent application FR-88 01188.

We claim:

1. An assembly device for a heat exchanger and tubular connector assembly, in which the tubular connector opens out into an opening in a tank of the heat exchanger and is fixed firstly to a flexible hose by a permanent connection and secondly to the tank via an easily disassembled resilient connection, with sealing between the tubular connector and the tank being provided by an elastomer ring which is radially compressed therebetween, the tubular connector and the tank being in alignment along an assembly axis and constituting two parts to be assembled by snap fastening at least one axially-directed tab carried on one of the two parts, said tab being radially resilient and provided with a snap-fastening catch, said catch engaging axial abutment means carried by the other one of the two parts, said radially resilient tab thus serving as an expansion spring whose resilient reaction acts in a radial direction tending to maintain the tab pressed against the abutment means when the said two parts are in the assembled position, wherein said tab is in the form of a leaf spring comprising a first branch and a second branch which are substantially parallel to each other and to the assembly axis, with the first branch projecting from one of the two parts in the assembly direction while the second branch projects from the axially inner end of the first branch in opposite direction to the assembly direction, such that the tab is generally U-shaped, with the catch projecting radially outwards from the second branch of the tab.

2. A device according to claim 1, wherein the axial abutment means is made in the form of a tubular lug in which the tab engages with the snap-fastening catch coming into abutment against an axially outer end thereof.

3. A device according to claim 1, wherein the other one of the two parts to be assembled includes an axial rib for bearing against the first branch of the tab in the assembled position.

4. A device according to claim 1, wherein the spring-forming tab is made integrally with one of the said two parts.

5. A device according to claim 1, wherein the spring-forming tab is a metal tab applied to or overmoled with one of the said two parts.

* * * * *

UNITED STATES PATENT AND TRADEMARK OFFICE
CERTIFICATE OF CORRECTION

PATENT NO. : 5,062,478
DATED : November 5, 1991
INVENTOR(S) : Michel Potier et al.

It is certified that error appears in the above-identified patent and that said Letters Patent is hereby corrected as shown below:

Column 2, line 25, "4,881,665" should be -- 4,887,665 --.

Column 2, line 39, "77" should be -- 7 --.

Column 2, line 44, "4,881,665" should be -- 4,887,665 --.

Column 3, line 21, "snap/fasten" should be
  -- snap-fasten --.

Column 4, line 36, "French patent application FR-88 01188" should be -- U.S. Pat. No. 4,887,665 --.

Column 6, line 5, "overmoled" should be -- overmolded --.

Signed and Sealed this

Tenth Day of August, 1993

Attest:

MICHAEL K. KIRK

Attesting Officer

Acting Commissioner of Patents and Trademarks